United States Patent [19]

Imaizumi et al.

[11] Patent Number: 4,541,747

[45] Date of Patent: Sep. 17, 1985

[54] MOTOR DRIVE CONTROL CIRCUIT TO RESTRICT MOTOR TEMPERATURE RISE BELOW AN UPPER LIMIT

[75] Inventors: Mamoru Imaizumi; Takashi Fujiwara; Masanari Kobayashi, all of Nagoya, Japan

[73] Assignee: Brother Kogyo Kabushiki Kaisha, Nagoya, Japan

[21] Appl. No.: 546,949

[22] Filed: Oct. 31, 1983

[30] Foreign Application Priority Data

Nov. 10, 1982 [JP] Japan .................. 57-197153

[51] Int. Cl.[4] ........................... B41J 1/30
[52] U.S. Cl. .................. 400/144.2; 400/320; 400/719; 310/53; 318/334
[58] Field of Search ........... 400/144.1, 144.2, 320, 400/322, 719; 310/16, 52, 53, 68 C, 227; 318/306, 334, 445, 452, 783; 336/55; 361/381

[56] References Cited

U.S. PATENT DOCUMENTS

| | | | |
|---|---|---|---|
| 2,280,914 | 4/1942 | Johns | 310/68 C X |
| 3,965,392 | 6/1976 | Moorhead et al. | 318/783 X |
| 4,118,129 | 10/1978 | Grundherr | 400/144.2 |
| 4,134,692 | 1/1979 | Suzuki et al. | 400/144.2 |
| 4,232,975 | 11/1980 | Kane | 400/144.2 |
| 4,307,967 | 12/1981 | Araki et al. | 400/144.2 |
| 4,398,837 | 8/1983 | Torii et al. | 400/144.2 X |
| 4,405,245 | 9/1983 | Fukushima | 400/144.2 |

FOREIGN PATENT DOCUMENTS

| | | | |
|---|---|---|---|
| 0164483 | 12/1981 | Japan | 400/719 |
| 0205170 | 12/1982 | Japan | 400/719 |
| 0059859 | 4/1983 | Japan | 400/322 |
| 2110852 | 6/1983 | United Kingdom | 400/144.2 |

Primary Examiner—Ernest T. Wright, Jr.
Attorney, Agent, or Firm—Browdy and Neimark

[57] ABSTRACT

A drive control system for controlling a drive motor in response to external command signals. The system comprises a first control arrangement for obtaining numerical values corresponding to amounts of successive intermittent operations of the drive motor responsive to respective external command signals, summing the obtained numerical values, and subtracting from a current sum of the numerical values a numerical value corresponding to a non-operation time period during which the drive motor is held at rest between the successive intermittent operations. The system further comprises a second control arrangement for inhibiting the operation of the drive motor responsive to the next command signal, for a length of time corresponding to the current sum after the drive motor has completed each of the intermittent operations, whereby the temperature of the drive motor is kept below an upper limit.

19 Claims, 4 Drawing Figures

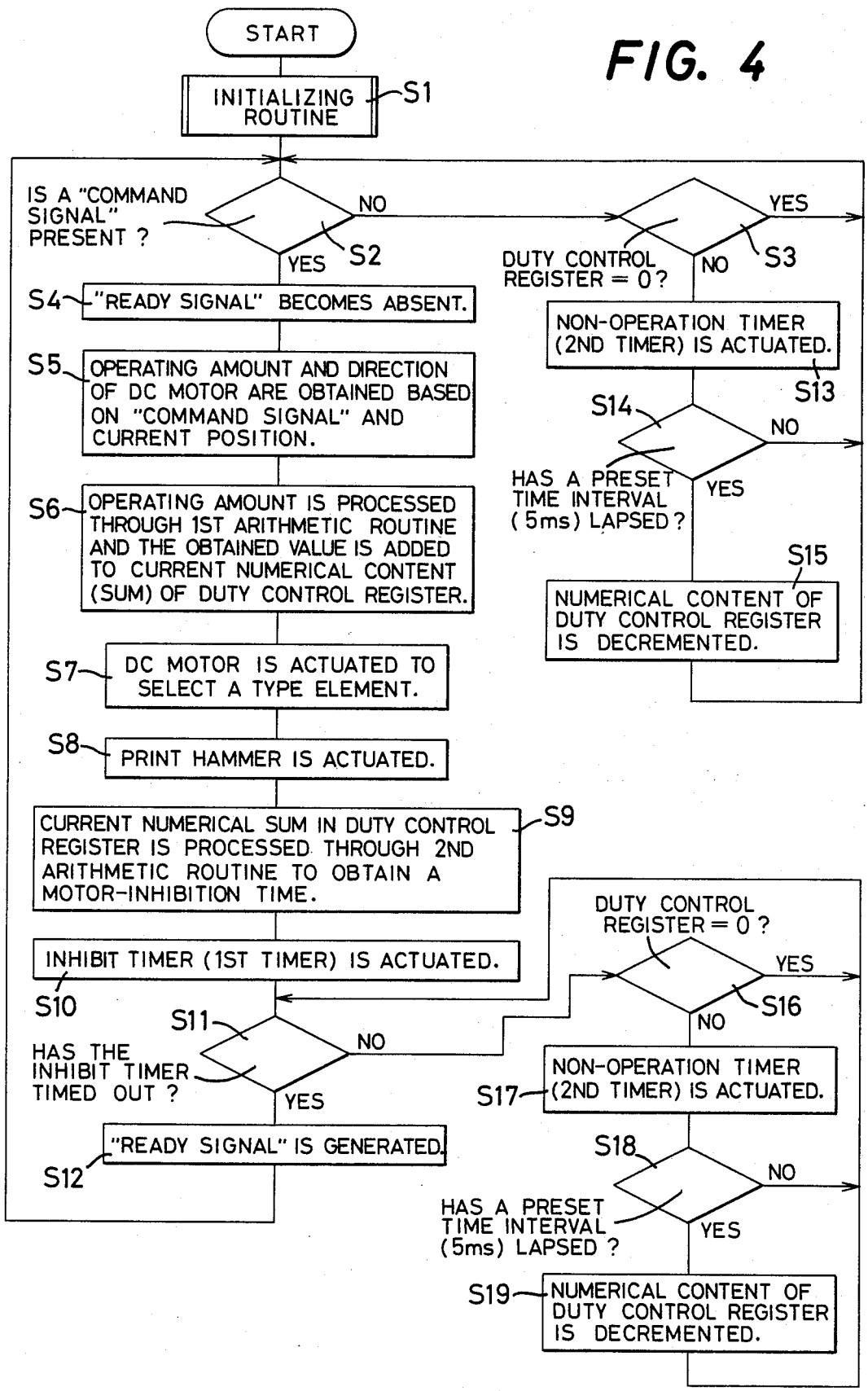

MOTOR DRIVE CONTROL CIRCUIT TO RESTRICT MOTOR TEMPERATURE RISE BELOW AN UPPER LIMIT

BACKGROUND OF THE INVENTION

The present invention relates in general to a motor drive control system responsive to external command signals for controlling an operation of a motor, and more particularly to such motor drive control system capable of restricting a temperature rise of the motor below a predetermined upper limit.

In the art of controlling a motor such as a DC motor in repeatedly or intermittently actuated manner in response to external command signals, it has been required to hold a temperature rise of the motor below a preset permissible level. To meet this requirement, it has been attempted to use a motor with a larger capacity or to provide a DC motor with a cooling device. However, such attempts necessarily suffer from problems; unnecessarily bulky or large-sized structure for increased capacity of the motor; complicated construction and increased operating noises due to the provision of a cooler; etc. In the meantime, there have been proposed some remedies or solutions to these problems. For example, a temperature sensor is provided for monitoring an operating temperature of the CD motor to turn off the motor upon temperature rise beyond a preset upper limit. In this arrangement, the DC motor is stopped unexpectedly regardless of the external command signal produced to operate the motor. Further, the motor which has been thus stopped must be kept at rest for a comparatively long period of time so that the motor temperature can be lowered enough to re-activate the motor. Thus, this solution is not completely satisfactory. It is also known to provide means for limiting an operating interval, i.e., the number of intermittent operations of a DC motor per unit time according to known operating characteristics of the specific motor, that is, to provide means for preventing the motor from repeating a start and stop cycle at a frequency higher than a preset limit. This arrangement is also inconvenient because it suffers unnecessary limitation in the number of intermittent operations of the motor that can be conducted within a given period of time.

According to a Japanese patent application No. 56-165916 filed Oct. 16, 1981 in the name of the assignee of the present invention, a method is proposed which is free from the above discussed inconveniences, in which a motor is neither unnecessarily limited in the number of operations per unit time, nor subject to an unexpected stop or a requirement for extra capacity or the provision of a cooling device. Although the above method is thus effective, it requires the detection of the angular position and rotating speed of the motor during rotation thereof and at the same time the measurement of a rotating time thereof, thereby inherently complicating a control circuit. Thus, the known methods are still disadvantageous.

SUMMARY OF THE INVENTION

It is accordingly an object of the present invention to provide a motor drive control system which includes a simple control circuit free from the inconveniences encountered in the prior art.

It is another object of the invention to provide a printer having a motor drive control system which assures efficient operations of drive motors at an operating temperature within a permissible range.

According to the invention, there is provided a motor drive control system for a drive motor in response to external command signals, comprising first means for obtaining numerical values corresponding to amounts of successive intermittent operations of the drive motor responsive to respective ones of the external command signals, summing the obtained numerical values, and subtracting from a current sum of the numerical values a numerical value corresponding to a non-operation time period during which the drive motor is held at rest between the successive intermittent operations. The control system further comprises second means for inhibiting the operation of the drive motor responsive to the next command signal, for a length of time corresponding to the current sum after the drive motor has completed each of the intermittent operations.

The first means comprises first arithemetic means for executing a first arithmetic routine to obtain the numerical values, the first arithmetic means including a duty control register for storing the current sum of the numerical values, each numerical value corresponding, or proportional, to the non-operation time period being subtracted from the sum stored in the duty control register. The first means ceases its subtracting operation when the sum stored in the duty control register has become zeroed, and the register is cleared when power is initially applied to the control system. In performing its executing function, the first arithemetic means multiplies the amounts of intermittent operation by a predetermined factor.

The second means comprises second arithmetic means for executing a second arithmetic routine to obtain a length of time, obtained by multiplying the current sum by a predetermined factor, during which the operation of the drive motor is inhibited.

Both the first and second means include timers. The timer of the first means is actuated when each of the intermittent operations of the drive motor has been completed, and the current sum stored in the duty control register is decremented each time a preset time interval if measured by the first means timer. The timer of the second means determines the length of time after the end of each intermittent operation and thereupon triggers the generation of a ready signal which permits each of the command signals to be acted upon for operating the drive motor.

In the motor drive control system constructed according to the present invention, the interval of intermittent operations of a motor can be variably controlled according to the operating condition of the motor so that the temperature rise is held below a predetermined upper limit, whereby the number of intermittent operations of the motor per unit time can be maintained at a higher level than in the known method wherein the motor is controlled so that the operating interval does not exceed a given upper level. In addition, the control system of the invention is free from the problem of unexpected stopping of the motor as experienced in the conventional control of the motor based on detection of its operating temperature. The instant system provides a further advantage that the operating interval can be shortened during a period of operation immediately following a relatively long period of rest of the motor, whereby a decrease in the operating speed or number of operations per unit time is prevented where the amounts of successive intermittent operations are held comparatively small. Further, the instant control system is effective for reduction in the amount of heat generated from the motor, thereby reducing the need for using a large-capacity motor or providing a motor with a cooling device. This makes the motor simple and small-sized. Also, it is noted that the control system of the present invention is provided in the form of a microcomputer which provides necessary circuits with a simple arrangement.

According to the invention, there is also provided a printer including a keyboard having a multiplicity of keys, a printing head having a type carrier with multiple type elements, a first drive motor responsive to command signals corresponding to the operated keys to operate the type carrier to bring the type elements into a printing position, a second drive motor responsive to the command signals to move the printing head along a line of printing, and a drive control system for controlling the first and second drive motors. The drive control system comprises first means for obtaining numerical values corresponding to amounts of successive intermittent displacements of at least one of the first and second drive motors responsive to respective ones of the command signals, summing the obtained numerical values, and subtracting from a current sum of the numerical values a numerical value corresponding to a non-operation time period during which the at least one drive motor is held at rest between the successive intermittent displacements. The drive control system further comprises second means for inhibiting the displacement of the at least one drive motor responsive to the next command signal, for a length of time corresponding to the current sum after the at least one drive motor has completed each of the intermittent displacements. The first and second means may be constructed as previously described.

In the printer constructed as described above, one or both of the first and second drive motors are controlled by the drive control system so that they are operated efficiently without a possibility of abnormal temperature rise, whereby an efficient high-speed printing operation is effected without an otherwise possible damage to the drive motor or motors.

BRIEF DESCRIPTION OF THE DRAWINGS

The above and other objects, features and advantages of the present invention, will become more apparent from reading the following description of the preferred embodiment taken in connection with the accompanying drawings in which:

FIG. 4 is a block schematic diagram showing sequential events of operations of the motor drive control system of FIGS. 2 and 3.

DETAILED DESCRIPTION OF THE PREFERRED EMBODIMENT

The present invention will now be described in detail referring to the accompanying drawings which show, for illustrative purpose only, a motor drive control system of the invention in its preferred form for use with an electronic printer which is also the subject matter of the invention.

Figure 1:
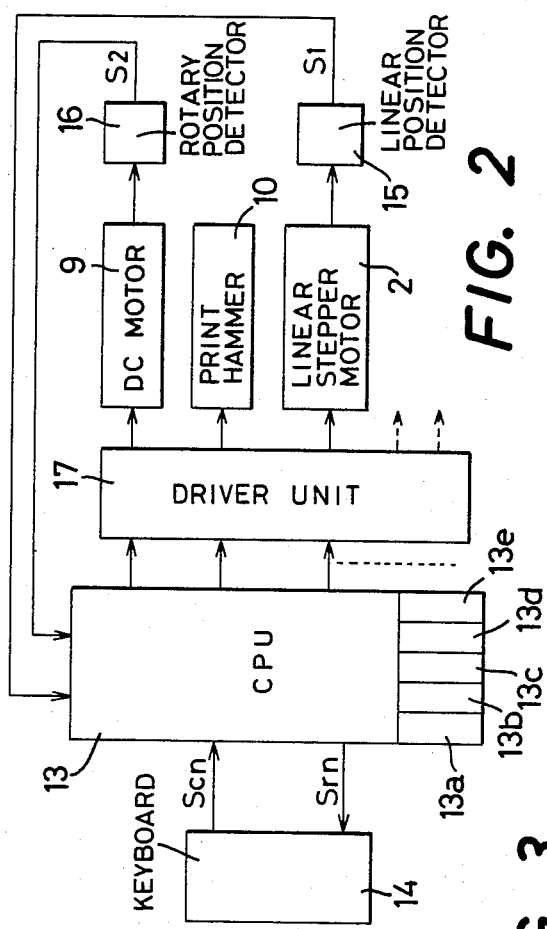
FIG. 1 is a perspective view showing parts of an electronic typewriter associated with one form of the present invention.

There is partially shown in FIG. 1 an electronic typewriter which comprises a platen 1, and a linear stepper motor 2 which includes a stator 3 extending alongside the platen 1 and a sliding member 4 linearly movable left and right on the stator 3 along the length of the latter. The typewriter further comprises a printing head 5 mounted on the sliding member 4 of the linear stepper motor 2. The printing head 5 comprises a type element carrier in the form of a print wheel 8 having a multiplicity of radially extending arms 7 which are spaced from each other circumferentially of the wheel 8 and carry at their free ends type elements 6. The printing head 5 further comprises a DC motor 9 for rotating the print wheel 8 to move the desired type element 6 into the printing position, and a print hammer 10 to strike the selected type element 6 to print the corresponding character on a sheet of paper 12 through an ink ribbon 11.

Figure 2:
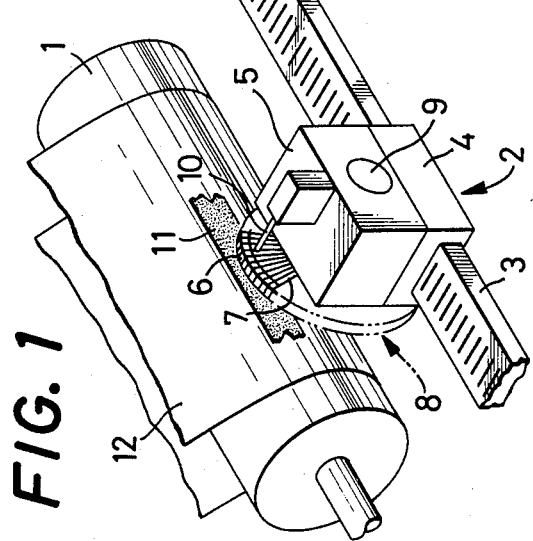
FIG. 2 is a block schematic diagram illustrating a control arrangement of the typewriter of FIG. 1 including one embodiment of a motor drive control system according to the invention.

Indicated at 13 in FIG. 2 is a CPU (central processing unit) of a microcomputer which comprises a motor drive control system constructed according to the invention. The CPU 13 is connected to a keyboard 14 of the electronic typewriter on which a large number of keys (not shown) are provided. The keyboard 14 generates COMMAND signals Scn representative of printing data corresponding to the activated keys. The CPU 13 is connected also to a linear position detector 15 which monitors a linear movement of the linear stepper motor 2, and to a rotary position detector 16 which monitors an angular position and a rotating speed V of the DC motor 9. The linear and rotary position detectors 15 and 16 produce DETECTION signals SD1 and SD2, respectively, during operations of the stepper motor and DC motor 9. Based on a stored program and incoming signals including the COMMAND signals Scn and the DETECTION signals SD1, SD2, the CPU 13 controls through a driver unit 17 the linear stepper motor 2, the DC motor 9, the print hammer 10, and other motors (not shown) which are provided to drive the platen 1 for feeding the sheet 12, to feed the ink ribbon 11 and to vertically oscillate the same between the print wheel 8 and the sheet 12.

Figure 3:
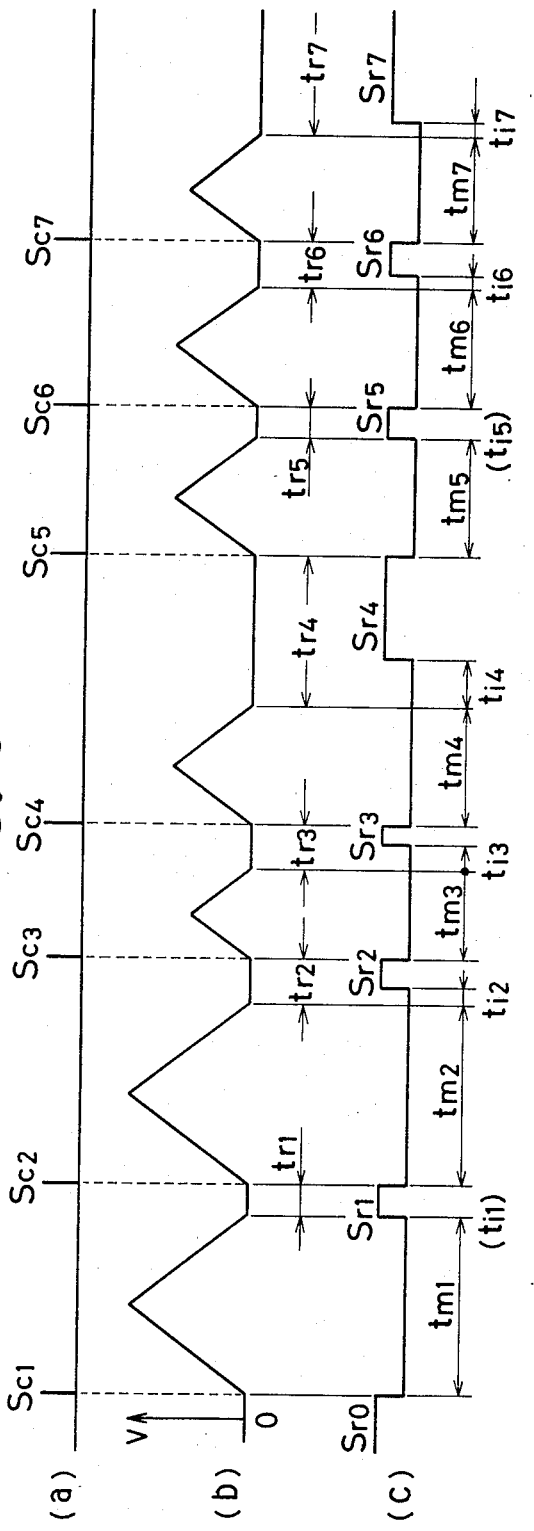
FIG. 3 is a timing chart explaining the operation of the control system of FIG. 2.

The CPU 13 includes a duty control register 13a, first and second arithmetic means 13b and 13c, and first and second timers 13d and 13e, the functions of which will be apparent from the following description referring to FIGS. 3 and 4 which depict, by way of example, events of operations of the instant control system performed for controlling the DC motor 9.

For easier understanding of the following description, the reader's attention is first directed to FIG. 3 which shows in timewise relation: at (a) a timing at which the COMMAND signals Scn (SC1 through SC7) for intermittent operations of the DC motor 9 are produced after a long period of rest of the DC motor 9; at (b) a variation in the rotating speed V of the DC motor 9; and at (c) the timing at which are generated READY signals Srn (Sr1 through Sr7) which enable the COMMAND signals Scn to be acted upon to operate the DC motor 9.

The sequential events of operations are now described with reference to sequential Step Nos. used in a block diagram of FIG. 4.

Upon power application to the control system, an initializing routine is executed in Step S1 to initialize various flags and I/O ports used or provided in the system, and to clear the duty control register 13a. The control system then checks to see, in Step S2, if a COMMAND signal Scn (Sc1) is present or not. If a COMMAND signal SCn is not present, the control goes to Step S3 to check whether the content of the duty control register 13a is zero or not. Since this register 13a has been cleared in Step 1 and its content is zero, the control goes back to the previous step S2. Thus, the steps S2 and S3 are repeated until a first COMMAND signal Sc1 is generated from the keyboard 14.

When the CPU 13 receives the first COMMAND signal Sc1 from the keyboard 14, the CPU 13 activates the DC motor 9 for a period tm1 according to the signal Sc1, as shown in FIG. 3, to obtain a rotary movement necessary to bring the selected type element 6 into the printing position, as indicated at Step S7 in FIG. 4. Stated more specifically, when the generation of the first COMMAND signal Sc1 is recognized, the control removes in Step S4 a READY signal Sr0 which has been present after the power application, and goes to Step S5 to calculate the necessary amount of said rotary movement (i.e., angular displacement of the print wheel 8) based on the current position of the DC motor 9 and the COMMAND signal Sc1 corresponding to the operated key on the keyboard 14. Then, in Step S6, the control executes a first predetermined arithmetic routine to obtain a numerical value corresponding to the calculated amount of the first rotary displacement of the DC motor 9. This calculation is performed, in this particular embodiment, by the first arithmetic means 13b, for example, by multiplying the amount of operation of the motor 9 by a predetermined factor, or by giving a weight to the amount of operation. It is noted here that while the numerical value to be obtained may or may not be proportional to the calculated amount of the displacement of the motor 9, the value corresponds in any manner to the calculated displacement amount. Stated in more detail, the calculated displacement of the motor 9 expressed in degrees of angle is multiplied by a factor in order to obtain a numerical value as a function of the time necessary for the motor to achieve the displacement to bring the selected type element 6 into the printing position. If desired, different weights are used in the calculation of the numerical value in view of differences in time between operation and non-operation times of the motor, and according to various operating conditions of the motor. These factor and weights are stored in the CPU 13. The numerical value thus calculated by the first arithmetic means is stored in the duty control register 13a. The DC motor 9 is operated in Step 7 by the calculated amount, and the print hammer 10 is actuated to strike the selected type element 6 onto the sheet of paper 12 (Step S8).

Successively in Step 9, the control executes a second predetermined arithmetic routine which is carried out, in this specific embodiment, by the second arithmetic means 13c to calculate a length of motor-inhibition time "tin" (til in this instance) during which the operation of the DC motor 9 responsive to the second COMMAND signal Sc2 is inhibited. This calculation is made based on the numerical value currently stored in the duty control register 13a, for example, by multiplying the currently stored value by a second predetermined factor, or by giving a weight to the stored value. The motor-inhibition time period "tin" may or may not be proportional to the value stored in the register 13a. It is noted, however, that the second arithmetic means 13c is adapted so that the motor-inhibition time "tin" is zero or extremely small when the currently stored value is relatively small or smaller than a predetermined lower limit.

At this point of time when the first displacment of the DC motor 9 has been just completed, the stored value is comparatively small and therefore the motor-inhibition time til obtained in Step S9 is zero. Accordingly, the first or INHIBIT timer 13d which is otherwise actuated in Step S10 is not actuated, and the control goes through Step S11 to Step S12 in which the READY signal Sr1 is generated as illustrated in FIG. 3. This READY signal Sr1 functions such that if the next COMMAND signal Sc2 is generated while the READY signal Sr1 is present, the signal Sc2 is allowed to be acted upon. In other words, the control system is now ready to accept the second COMMAND signal Sc2.

Thus, the control system returns to Step S2 and awaits the second COMMAND signal Sc2. While the control system is awaiting the signal Sc2, the previously discussed Step S3 is executed. At this point of time, a numerical value has been stored in the duty control register 13a in Step S6, the control goes to Step S13 to activate the second (NON-OPERATION) timer 13e which is designed to decrement the stored numerical value each time a preset time interval, e.g. 5ms, has lapsed, as shown in Steps S14 and A15. Thus, the numerical value stored in the duty control register 13a is decreased as a function of non-operation time during which the DC motor 9 is held at rest, that is, the value stored in the register 13a is decremented while the READY signal Sr1 is present or until the second COMMAND signal Sc2 is generated. This subtracting operation is conducted through execution of a series of Steps S3, S14–S15 and S2, and stopped if the stored numerical value has been zeroed.

When the second COMMAND signal Sc2 is generated while the READY signal Sr1 is present, the DC motor 9 is operated to select the type element 6 corresponding to the COMMAND signal Sc2, and a numerical value corresponding to the operating amount of the motor 9 is calculated and added to the numerical value stored in the duty control register 13a as indicated at Step S6. Further, the motor-inhibition time ti2 is calculated in Step S9 as previously described. At this time, the numerical content of the register 13a is comparatively large and a slight length of motor-inhibition time ti2 is obtained, whereby the INHIBIT timer 13d is actuated in Step S10. The control checks in the following Step S11 to see whether the INHIBIT timer 13d has timed out or not. Thus, the operation of the DC motor 9 responsive to the next COMMAND signal Sc3 is inhibited for the length of time ti2. During this non-operation time, a numerical value corresponding to the motor-inhibition time ti2 is subtracted from the value stored in the register 13a. More particularly stated, Steps S16 through S19 which are identical to the previously discussed Steps S3, S13–S15 are executed until the INHIBIT timer 13d has timed out.

When the INHIBIT timer 13d has timed out, the READY signal Sr2 is generated and the non-operation time is measured by the NON-OPERATION timer 13e to decrement the value stored in the register 13a until the third COMMAND signal Sc3 is generated.

As is apparent from the foregoing description, numerical values corresponding to the operating amounts of the DC motor 9 are cumulatively added to the current sum stored in the register 13a, and a numerical value corresponding to the non-operation time "trn"

(tr1 through tr7) is subtracted from the stored value. It is noted that the time "trn" is a sum of the motor-inhibition time "tin" (ti1 through ti7) and the ready time during which the READY signal Srn (Sr1 through Sr7) is present.

In the above discussed arrangement, the value to be subtracted from the stored value is increased as the non-operation time "trn" of the DC motor 9 becomes longer. During an initial period of operation of the motor after a long rest, the motor-inhibition time period "tin" is zero or very short. For example, the first and fifth motor-inhibition time periods ti1 and ti5 are zero, and the second and sixth motor-inhibition time periods ti2 and ti6 are considerably short. Further, as the number of intermittent operations of the motor 9 based on the successive COMMAND signals Scn is increased, the motor-inhibition time period "tin" is gradually increased.

As described hereinbefore, the operating amount of the DC motor 9 is determined based on the COMMAND signals Scn and therefore it is not necessary to measure the operating time (tm1 through tm7) while detecting the operating position and speed, as practiced in the art, whereby the control system can be made simple. Further, it is possible to change the previously indicated factors or weights used in the first and second arithmetic routines to obtain the numerical value corresponding to the operating amount of the DC motor 9 and the motor-inhibition time "tin" corresponding to the currently stored numerical value. It is also possible to change the time interval at which the stored value is decremented during measurement of the non-operation time by the NON-OPERATION timer 13e. Such changes make it possible to adjust the motor-inhibition time period "tin". Thus, in the case where the control system is used for a motor which is designed to conduct a constant-speed operation between acceleration and deceleration (unlike a linear accleration-deceleration mode shown in FIG. 3), the motor-inhibition time periods may be determined by giving high weights to periods of acceleration and deceleration of the motor which cause a higher degree of heat generation, and giving a low weight to the constant-speed operation which causes less heat generation.

While the present invention has been described in its preferred embodiments, it is to be understood that the invention is not limited thereto but may be otherwise embodied. For example, the present control system can be applied to the linear stepper motor 2 which moves the printing head 5 along a line of printing parallel to the platen 1.

Furthermore, the instant control system can be used to control a drive motor which operates a type element carrier in the form of a print ball rather than a print wheel as shown in FIG. 1.

Further, while the arithmetic routines are used to calculate the numerical values and the inhibition time periods as previously discussed, these values and time periods may be obtained by retrieving appropriate data which are stored in a read-only-memory according to the principle of the present invention.

What is claimed is:

1. A drive control system for controlling a drive motor in response to external command signals, comprising:

first means for obtaining numerical values corresponding to amounts of successive intermittent operations of said drive motor responsive to respective ones of said external command signals, summing the obtained numerical values, and subtracting from a current sum of the numerical values of numerical value corresponding to a non-operation time period during which said drive motor is held at rest between said successive intermittent operations; and second means for inhibiting the operation of said drive motor responsive to the next command signal, for a length of time corresponding to said current sum after said drive motor has completed each of said intermittent operations.

2. A drive control system as recited in claim 1, wherein said first means comprises first arithmetic means for executing a first arithmetic routine to obtain said numerical values, said first means further comprising a duty control register for storing said current sum of the numerical values, said numerical value corresponding to said non-operation time period being subtracted from the sum stored in said duty control register.

3. A drive control system as recited in claim 2, wherein said first means stops its subtracting operation when said sum stored in said duty control register has become zeroed, said register being cleared when power is initially applied to the control system.

4. A drive control system as recited in claim 2, wherein said first arithmetic means multiplies said amounts of intermittent operations by a predetermined factor.

5. A drive control system as recited in claim 2, wherein said numerical value to be subtracted from said current sum is proportional to said non-operation time period.

6. A drive control system as recited in claim 2, wherein said length of time is proportional to said current sum stored in said duty control register.

7. A drive control system as recited in claim 2, wherein said second means comprises second arithmetic means for executing a second arithmetic routine to obtain said length of time during which the operation of said drive motor is inhibited.

8. A drive control system as recited in claim 7, wherein said second arithmetic means multiplies said current sum by a predetermined factor.

9. A drive control system as recited in claim 7, wherein said second means further comprises a first timer which times out said length of time after the end of each of said intermittent operations, thereby triggering generation of a ready signal which permits each of said command signals to be acted upon for operating said drive motor.

10. A drive control system as recited in claim 2, wherein said first means further comprises a second timer which is actuated when each of said intermittent operations of the drive motor has been completed, said current sum stored in said duty control register being decremented each time a preset time interval is measured by said second timer.

11. A drive control system as recited in claim 1, wherein said motor is a direct current motor which provides rotary movements.

12. A drive control system as recited in claim 1, wherein said motor is a stepper motor which provides linear movements.

13. A drive control system for controlling a drive motor in response to external command signals, comprising:

first means including first arithmetic means for executing a first arithmetic routine to obtain numerical values corresponding to amounts of successive intermittent operations of said drive motor responsive to respective ones of said external command signals, and further including a duty control register for storing a sum of the obtained numerical values, said first means subtracting from said sum stored in said duty control register a numerical value corresponding to a non-operation time period during which said drive motor is held at rest between said successive intermittent operations; and second means for inhibiting the operation of said drive motor responsive to the next command signal, for a length of time corresponding to the current sum of said numerical values after said drive motor has completed each of said intermittent operations, said second means including a second arithmetic means for executing a second arithmetic routine to obtain said length of time of inhibiting said drive motor.

14. A drive control system for controlling a drive motor to drive a print wheel for a printer having a keyboard, the print wheel having a multiplicity of radially extending arms circumferentially spaced from each other, the arms having at their free ends type elements which are selectively moved into a printing position through rotation of the print wheel upon generation of command signals generated from said keyboard, said drive control system comprising:

first means for obtaining numerical values corresponding to amounts of successive intermittent angular displacements of said drive motor responsive to respective ones of said command signals, summing the obtained numerical values, and subtracting from a current sum of the numerical values a numerical value corresponding to a non-operation time period during which said drive motor is held at rest between said successive intermittent angular displacements; and second means for inhibiting the operation of said drive motor responsive to the next command signal, for a length of time corresponding to said current sum after said drive motor has completed each of said intermittent angular displacements.

15. A printer including a keyboard, a printing head having a type carrier with multiple type elements, a first drive motor responsive to command signals from the keyboard to operate said type carrier to bring said type elements into a printing position, a second drive motor responsive to said command signals to move said printing head along a line of printing, and a drive control system for controlling said first and second drive motors, said drive control system comprising:

first means for obtaining numerical values corresponding to amounts of successive intermittent displacements of at least one of said first and second drive motors responsive to respective ones of said command signals, summing the obtained numerical values, and subtracting from a current sum of the numerical values a numerical value corresponding to a non-operation time period during which said at least one drive motor is held at rest between said successive intermittent displacements; and second means for inhibiting the operation of said at least one drive motor responsive to the next command signal, for a length of time corresponding to said current sum after said at least one drive motor has completed each of said intermittent displacements.

16. A printer as recited in claim 15, wherein said first drive motor is a direct current motor.

17. A printer as recited in claim 15, wherein said second drive motor is a linear stepper motor to move said printing head.

18. A printer as recited in claim 15, wherein both of said first and second drive motors are operated under control of said first and second means.

19. A drive control system for controlling a drive motor in response to external command signals, comprising:

means for obtaining first numerical values corresponding to amounts of successive intermittent operations of said drive motor responsive to respective ones of said external command signals;

means for obtaining a second numerical value corresponding to a non-operation time period during which said drive motor is held at rest between said successive intermittent operations;

calculating means for summing each of said first numerical values and subtracting said second numerical value from a current sum of said first numerical values; and means for inhibiting the operation of said drive motor responsive to the next command signal, for a length of time corresponding to the numerical result calculated by said calculating means after said drive motor has completed each of said intermittent operations.

* * * * *